(12) United States Patent
Li et al.

(10) Patent No.: US 8,948,195 B2
(45) Date of Patent: *Feb. 3, 2015

(54) COMMUNICATION OVERHEAD REDUCTION APPARATUS, SYSTEMS, AND METHODS

(71) Applicant: Intel Corporation, Santa Clara, CA (US)

(72) Inventors: Qinghua Li, San Ramon, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,823

(22) Filed: Feb. 4, 2013

(65) Prior Publication Data

US 2013/0208820 A1    Aug. 15, 2013

Related U.S. Application Data

(63) Continuation of application No. 10/751,001, filed on Dec. 30, 2003, now Pat. No. 8,369,790.

(51) Int. Cl.
*H04J 3/16* (2006.01)
*H04B 7/04* (2006.01)
*H04W 52/42* (2009.01)

(52) U.S. Cl.
CPC ............. *H04B 7/0417* (2013.01); *H04W 52/42* (2013.01)
USPC .......................................................... 370/437

(58) Field of Classification Search
USPC ................. 370/252, 329, 334, 310, 318, 437; 375/267, 299, 260, 347, 349; 455/101, 455/103
See application file for complete search history.

(56) References Cited

U.S. PATENT DOCUMENTS

| | | |
|---|---|---|
| 5,515,378 A | 5/1996 | Roy, III et al. |
| 5,909,649 A | 6/1999 | Saunders |
| 5,936,569 A | 8/1999 | Stahle et al. |
| 6,047,189 A | 4/2000 | Yun et al. |
| 6,144,711 A | 11/2000 | Raleigh et al. |
| 6,377,631 B1 | 4/2002 | Raleigh |
| 6,549,585 B2 | 4/2003 | Naguib et al. |
| 6,593,880 B2 | 7/2003 | Velazquez et al. |
| 6,771,706 B2 * | 8/2004 | Ling et al. ..................... 375/267 |
| 6,795,407 B2 | 9/2004 | Chesson |
| 6,850,481 B2 | 2/2005 | Wu et al. |
| 6,965,762 B2 | 11/2005 | Sugar |
| 6,978,151 B2 | 12/2005 | Choi et al. |
| 7,024,163 B1 | 4/2006 | Barratt |

(Continued)

OTHER PUBLICATIONS

"U.S. Appl. No. 10/751,001, Response filed Jun. 25, 2012 to Non Final Office Action mailed Jan. 25, 2012", 12 pgs.

(Continued)

*Primary Examiner* — Phuongchau Ba Nguyen
(74) *Attorney, Agent, or Firm* — Schwegman Lundberg & Woessner, P.A.

(57) ABSTRACT

An apparatus and a system, as well as a method and article, may operate to transmit a first number of training symbols corresponding to a first number of communication chains to solicit a response including a second number of training symbols corresponding to a second number of communication chains. The first and second number of communication chains may form a portion of a multiple-input, multiple-output (MIMO) system.

20 Claims, 8 Drawing Sheets

(56) References Cited

U.S. PATENT DOCUMENTS

| | | | |
|---|---|---|---|
| 7,139,340 B2 | 11/2006 | Scarpa | |
| 7,194,237 B2 | 3/2007 | Sugar et al. | |
| 7,206,550 B2 | 4/2007 | Li et al. | |
| 7,373,112 B2 | 5/2008 | Stephens et al. | |
| 7,461,164 B2 | 12/2008 | Edwards et al. | |
| 8,369,790 B2 * | 2/2013 | Li et al. | 455/67.11 |
| 2002/0041635 A1 | 4/2002 | Ma et al. | |
| 2002/0110138 A1 * | 8/2002 | Schramm | 370/430 |
| 2002/0191573 A1 * | 12/2002 | Whitehill et al. | 370/338 |
| 2003/0072255 A1 | 4/2003 | Ma et al. | |
| 2003/0072382 A1 | 4/2003 | Raleigh et al. | |
| 2003/0076777 A1 * | 4/2003 | Stuber et al. | 370/206 |
| 2004/0062211 A1 | 4/2004 | Uhlik | |
| 2004/0062302 A1 | 4/2004 | Fujii et al. | |
| 2004/0131012 A1 * | 7/2004 | Mody et al. | 370/210 |
| 2004/0146018 A1 | 7/2004 | Walton et al. | |
| 2004/0151145 A1 | 8/2004 | Hammerschmidt | |
| 2004/0190636 A1 | 9/2004 | Oprea | |
| 2004/0192218 A1 | 9/2004 | Oprea | |
| 2005/0032478 A1 | 2/2005 | Stephens et al. | |
| 2005/0094740 A1 | 5/2005 | Borran et al. | |
| 2005/0128953 A1 | 6/2005 | Wallace et al. | |
| 2005/0135403 A1 | 6/2005 | Ketchum et al. | |
| 2005/0141459 A1 | 6/2005 | Li et al. | |
| 2005/0141540 A1 | 6/2005 | Li et al. | |
| 2005/0143014 A1 | 6/2005 | Li et al. | |

OTHER PUBLICATIONS

"U.S. Appl. No. 10/751,001, Advisory Action mailed Jul. 19, 2010", 3 pgs.

"U.S. Appl. No. 10/751,001, Final Office Action mailed Apr. 2, 2010", 28.

"U.S. Appl. No. 10/751,001, Non Final Office Action mailed Jan. 25, 2012", 31 pgs.

"U.S. Appl. No. 10/751,001, Non Final Office Action mailed Jun. 24, 2011", 23 pgs.

"U.S. Appl. No. 10/751,001, Non Final Office Action mailed Aug. 3, 2009", 32 pgs.

"U.S. Appl. No. 10/751,001, Notice of Allowance mailed Oct. 2, 2012", 8 pgs.

"U.S. Appl. No. 10/751,001, Response filed Jun. 29, 2010 to Final Office Action mailed Apr. 2, 2010", 13 pgs.

"U.S. Appl. No. 10/751,001, Response filed Nov. 23, 2009 to Non Final Office Action mailed Aug. 3, 2009", 13 pgs.

"U.S. Appl. No. 10/751,001, Response filed Sep. 26, 2011 to Non Final Office Action mailed Jun. 24, 2011", 12 pgs.

U.S. Appl. No. 10/749,904, Notice of Allowance mailed Dec. 5, 2006, 10 pgs.

U.S. Appl. No. 10/749,904, Preliminary Amendment Aug. 24, 2004, 11 pgs.

* cited by examiner

COMMUNICATION OVERHEAD REDUCTION APPARATUS, SYSTEMS, AND METHODS

RELATED APPLICATIONS

This application is a continuation of U.S. patent application Ser. No. 10/751,001, filed on Dec. 30, 2003, now issued as U.S. Pat. No. 8,369,90, which is incorporated herein by reference in its entirety.

This disclosure is related to U.S. patent application Ser. No. 10/749,904, titled "ANTENNA SUBSYSTEM CALIBRATION APPARATUS AND METHODS IN SPATIAL-DIVISION MULTIPLE-ACCESS SYSTEMS", by Qinghua Li and Xintian E. Lin, filed on Dec. 29, 2003, now issued as U.S. Pat. No. 7,206,550, and is assigned to the assignee of the embodiments disclosed herein, Intel Corporation.

TECHNICAL FIELD

Various embodiments described herein relate to communications generally, including apparatus, systems, and methods used to transmit and receive information, such as space-time communications systems.

BACKGROUND INFORMATION

Spatial multiplexing communications system performance, including SDMA (space division, multiple access) and MIMO (multiple-input, multiple-output) systems, may be improved by the activities of training and calibration. Training may include transmitting known signals to a receiver to increase the reliability of estimating channel state information. While longer training sequences may provide increased reception accuracy, the use of such sequences may also reduce the advantage to be gained by using spatial multiplexing in the first place (i.e., high data rates). Similarly, while calibrating transmitter power and receiver gains can contribute to improved data transmission rates, the additional time required for periodic calibration may decrease the ultimate system capability to communicate large amounts of data in a short time span.

DETAILED DESCRIPTION

MIMO system techniques can multiply the data rate of a wireless local area network (WLAN) by nearly as many times as the number of antennas employed by an access point (AP) without the need for increased spectrum usage. MIMO systems exploiting channel state information (CSI) at the transmitter have the potential to reduce receiver complexity while achieving increased channel capacity. Common examples of such techniques include transmit beamforming (e.g., singular value decomposition or SVD), adaptive bit loading (ABL), and power allocation (e.g., tone puncturing). Sometimes relevant CSI cannot be obtained directly via training, because training symbol measurements are the aggregate response of several components, including the transmit chain response of the transmitting device, the wireless channel response, and the receive chain response of the receiving device. Therefore, accurate measurements of training symbols may be assisted by calibration.

CSI at the transmitter may be obtained by having the transmitter send training symbols to a receiver, and then feeding back receiver measurements of the received channel response to the transmitter. Unfortunately, this time-consuming feedback process does not lend itself to situations where high throughput is desired, such as when various forms of the Institute of Electrical and Electronics Engineers (IEEE) 802.11 protocols are employed, including those considered by the High Throughput (HT) Study Group. For example, the round-trip channel responses of 2-by-2 and 4-by-4 MIMO systems using such feedback typically require 62 µs and 247 µs, respectively, at a 54 Mbps channel data rate. For more information on the IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments.

Thus, in many embodiments of the invention, mechanisms are disclosed that do not require CSI feedback from the receiver. In some embodiments, calibration schemes attempt to provide a ratio of transmit chain gain to corresponding receive chain gain that is substantially constant for each antenna, at both the transmitter and the receiver. In some embodiments, calibration on one side (i.e., a transmitter or receiver) and channel estimation on the other side (i.e., the corresponding receiver or transmitter can be accomplished in a substantially simultaneous fashion using the same sets of symbols, or preambles. Backward-compatible protocols using existing RTS/CTS (request-to-send/clear-to-send) symbols or messages may be used (e.g., 802.11 and related amendments). Thus, in many embodiments of the invention, calibration and training, including channel estimation, at both the transmitter and receiver may be accomplished during an exchange of RTS/CTS symbols without explicit CSI feedback. For the purposes of this document, a "symbol" or "training symbol" may include any character, symbol, or message known to a receiver, including, for example, preambles, such as the long and short preambles defined with respect to an IEEE 802.11a standard packet.

Figure 1:
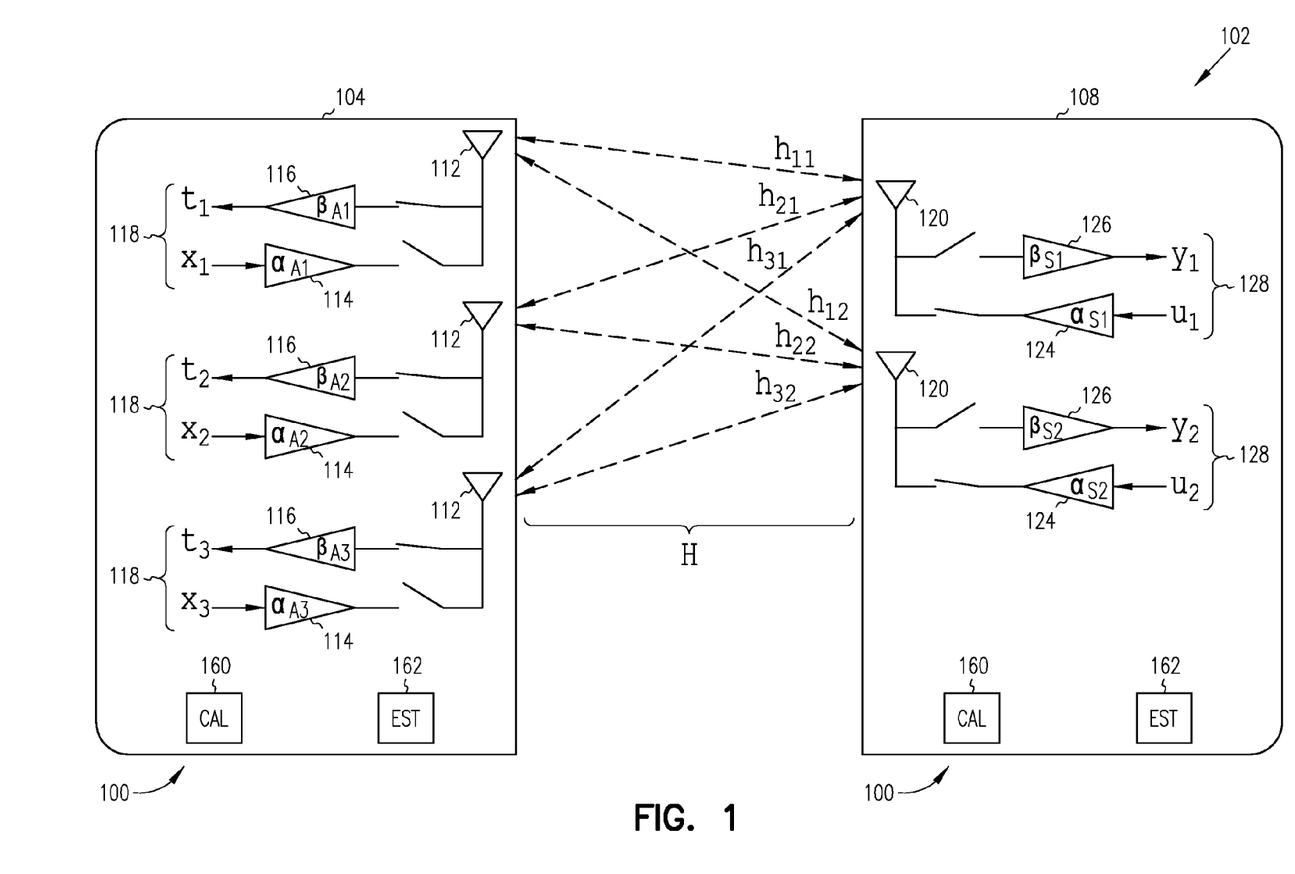
FIG. 1 is a block diagram of apparatus and a system operating according to various embodiments.

FIG. 1 is a block diagram of apparatus 100 and a system 102 operating according to various embodiments. In the system 102, a first device 104, such as an access point (AP) or station (STA) may communicate with a second device 108, such as a STA or AP. The first device 104 may have a plurality of antennas 112 (e.g., three antennas 112), with one or more transmit chains 114 and one or more receive chains 116 coupled to each antenna 112. Each transmit chain 114-receive chain 116 pair may be included in a communication chain 118. The second device 108 may also have a plurality of antennas 120 (e.g., two antennas 120), where each antenna 120 also may be coupled to one or more transmit chains 124 and/or one or more receive chains 126. Each transmit chain 124-receive chain 126 pair may be included in a communication chain 128. Each transmit chain 114, 124 in one device 104, 108, respectively, may send training and calibration symbols to all receive chains 126, 116 included in another device 108, 104, respectively. For the purposes of this disclosure, the term "transceiver" (e.g., a device including a transmitter and a receiver) may be used in place of either "transmitter" or "receiver" throughout this document, and a transceiver may be included in a transmit chain and/or a receive chain.

Some communication systems may employ CSI, which may be acquired by receiving symbols, including preambles. However, as noted previously, the measurements of received preambles may include more than just the response of the wireless channel. For example, such measurements may include the combined responses of the transmit chains sending the preambles, the wireless channel, and the receive chain receiving the preambles. Thus, in some MIMO downlinks, the beamforming matrix can be affected by the combined responses of the transmit chains of the AP, the wireless channel, and the receive chains of the STA. In some cases, the chain responses of the STA may not be available to the AP.

In some embodiments, based on the preambles sent by the station, the device 104 can estimate the aggregate channel matrix from the input of the device 108 transmit chains 124 to the output of the device 104 receive chains 116 for the n-th subcarrier as shown in Equation (1):

$$H_u = \begin{bmatrix} \beta_{A1} & 0 & 0 \\ 0 & \beta_{A2} & 0 \\ 0 & 0 & \beta_{A3} \end{bmatrix} \begin{bmatrix} h_{11} & h_{12} \\ h_{21} & h_{22} \\ h_{31} & h_{32} \end{bmatrix} \begin{bmatrix} a_{S1} & 0 \\ 0 & a_{S2} \end{bmatrix} \quad (1)$$

where H is the wireless channel matrix for the uplink; $\beta_{A1}$, $\beta_{A2}$ and $\beta_{A3}$ are the responses of the device 104 receive chains 116; and $\alpha_{S1}$ and $\alpha_{S2}$ are the responses of the transmit chains for the device 108. The subcarrier index, n, has been omitted for simplicity. It should be noted that H may not be observed by the device 104, although it may be contained within $H_u$, where $H_u$ is the measurement of the received training symbols (e.g., preambles). However, even when H is not available directly, in some embodiments, the matrix H may be used without further processing.

For example, consider the prior art, where transmit beamforming (including techniques such as SVD and SDMA) may utilize explicit feedback from the receiver. For medium size packets, including those having about 500 bytes, feedback overhead can reduce physical layer efficiency by more than 40%. Thus, in various embodiments, reducing or removing feedback can significantly improve physical layer efficiency. To effect such a mechanism, several backward compatible protocols will be described, employing the exchange of existing RTS/CTS symbols, as well as various calibration techniques, some of which operate to adjust transmit/receive chain power and gain levels so that the ratio of a transmit gain to the corresponding receive gain comprises two constants (one for each device 104 antenna 112, and the other for each device 108 antenna 120).

Given the parameters established in Equation (1), the signals received at the device 108 from the device 104 in the downlink of FIG. 1 may be illustrated by Equation (2) below:

$$\begin{bmatrix} y_{S1} \\ y_{S2} \end{bmatrix} = \begin{bmatrix} \beta_{S1} & 0 \\ 0 & \beta_{S2} \end{bmatrix} \begin{bmatrix} h_{11} & h_{21} & h_{31} \\ h_{12} & h_{22} & h_{32} \end{bmatrix} \underbrace{\begin{bmatrix} \alpha_{A1} & 0 & 0 \\ 0 & \alpha_{A2} & 0 \\ 0 & 0 & \alpha_{A3} \end{bmatrix}}_{H_d} \begin{bmatrix} x_{A1} \\ x_{A2} \\ x_{A3} \end{bmatrix} \quad (2)$$

where $y_{S1}$ and $y_{S2}$ signify the received signal at the output of the device 108 receive chains 126; $x_{A1}$, $x_{A2}$, and $x_{A3}$ are the symbols sent to the device 108; $\alpha_{A1}$, $\alpha_{A2}$ and $\alpha_{A3}$ are the device 104 transmit chain 114 gains; and $\beta_{S1}$ and $\beta_{S2}$ are the device 108 receive chain 126 gains. As a matter of contrast, the signals received at the device 104 from the device 108 in the uplink may be illustrated by Equation (3) below:

$$\begin{bmatrix} y_{A1} \\ y_{A2} \\ y_{A3} \end{bmatrix} = \underbrace{\begin{bmatrix} \beta_{A1} & 0 & 0 \\ 0 & \beta_{A2} & 0 \\ 0 & 0 & \beta_{A3} \end{bmatrix} \begin{bmatrix} h_{11} & h_{12} \\ h_{21} & h_{22} \\ h_{31} & h_{32} \end{bmatrix}}_{H_u} \begin{bmatrix} \alpha_{S1} & 0 \\ 0 & \alpha_{S2} \end{bmatrix} \begin{bmatrix} x_{S1} \\ x_{S2} \end{bmatrix} \quad (3)$$

where $x_{S1}$ and $x_{S2}$ are the symbols sent to the device 104; $y_{A1}$, $y_{A2}$, and $y_{A3}$ are the signals received at the output of the device 104 receive chains 116; $\alpha_{S1}$ and $\alpha_{S2}$ are the device 108 transmit chain 124 gains; and $\beta_{A1}$, $\beta_{A2}$ and $\beta_{A3}$ are the device 104 receive chain 116 gains.

Two aggregate channels, $H_d$ and $H_u$, may be defined as shown in Equations (2) and (3). If the aggregate channels $H_d$ and $H_u$ maintain reciprocity, (i.e., $H_d = H_u^T$), the estimated aggregate channel may be employed without decomposition to perform transmit beamforming.

A sufficient condition for reciprocity may be shown in Equations (4) and (5) as follows:

$$\frac{\alpha_{A1}}{\beta_{A1}} = \frac{\alpha_{A2}}{\beta_{A2}} = \frac{\alpha_{A3}}{\beta_{A3}} = c_n \quad (4)$$

$$\frac{\alpha_{S1}}{\beta_{S1}} = \frac{\alpha_{S2}}{\beta_{S2}} = b_n \quad (5)$$

where $c_n$ and $b_n$ are two constants for the n-th subcarrier. To satisfy the condition of reciprocity exactly, $c_n$ may be set equal to $b_n$. However, in many embodiments, it may be sufficient that $H_d = k_n H_u^T$, where $H_d$ and $H_u^T$ differ by the product of a scalar $k_n$. To satisfy the conditions set by Equations (4) and (5) then, calibration and compensation may be effected at device 104 and device 108. Two exemplary schemes that may be used to achieve these conditions are described next.

Figure 2:
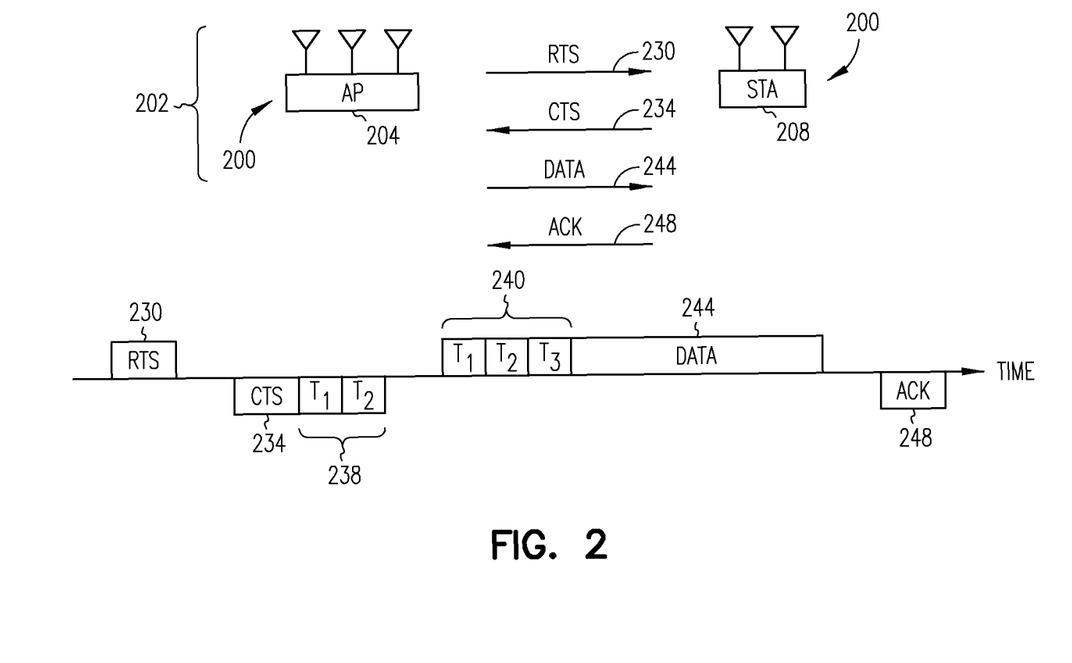
FIG. 2 is a block diagram of apparatus and a system operating according to various embodiments.

FIG. 2 is a block diagram of apparatus 200 and a system 202 operating according to various embodiments. Each device 204, 208 (which may be similar to or identical to devices 104, 108, respectively, as shown in FIG. 1, and may include an AP and/or a STA) may have multiple transmit power control (TPC) levels and multiple receive gain control levels, including automatic gain control (AGC) levels, for each of the included communication chains. Further, transmit and receive responses, $\alpha$ and $\beta$, may vary with selected TPC and AGC settings. Thus, implementing a series of training exchanges for each possible combination of TPC and AGC (e.g., when there is no prior information about the desired setting) may be time-consuming if there are a large number of combinations. However, as explained hereinbelow, in various embodiments, desired combinations of TPC and AGC settings may be established relatively quickly with respect to the devices 204, 208, such that calibration can occur rapidly.

In a first scheme, one device 204 may send one or more symbols 230, such as a request to transmit (e.g., a legacy RTS symbol or message) to the device 208 using a default TPC. Then, after the device 208 receives the transmitted symbol(s) (e.g., the RTS) 230, the device 208 may determine a set of desired AGC and TPC settings for the link to the device 204.

At this point, the device 208 may send a symbol 234 in response, such as a clear to transmit response (e.g., a legacy CTS symbol or message) and $N_r$ training symbols 238, where $N_r$ is the number of receive antennas (or RF chains) employed by the device 208, which may use the same $N_r$ antennas to receive one or more MIMO modulated data packets. The $N_r$ symbols 238, which may be used for training, can be sent in turn by each one of the $N_r$ antennas, perhaps using one symbol per antenna.

After the device 204 receives the response 234 (e.g., the CTS symbol), the device 204 may determine a set of desired AGC and TPC settings for the link to the device 208. Reception of the $N_r$ training symbols 238 may be used by the device 204 to estimate the $N_t \times N_r$ channel, which may be a MIMO channel, where $N_t$ is the number of transmit antennas (or RF chains) included in the device 204. The device 204 may use the same $N_t$ antennas for channel estimation and data transmission, including MIMO data transmission. The $N_r$ training symbols 238 received by the device 208 may also be used to calibrate the communication chains (e.g., chains 128 shown in FIG. 1) included in the device 208 for the newly determined set of TPC and AGC settings.

The device 204 may subsequently transmit $N_t$ training symbols 240 and data 244, including MIMO modulated data, to the device 208. The $N_t$ training symbols 240 may be sent by $N_t$ antennas (or RF chains), perhaps using one symbol per antenna at a desired TPC setting. The device 204 may receive the $N_t$ training symbols 240 at a desired AGC setting and calibrate the communication chains included in the device 204 (e.g., chains 118 in FIG. 1). The communication chains included in the device 208 may likewise be calibrated after transmission of the $N_t$ training symbols 240. Beamforming, perhaps as a form of MIMO system modulation, may be performed by the device 204 with respect to data sent by the device 204 to the device 208 using the channel information obtained as a result of receiving the response 234 from the device 208.

During reception of the $N_t$ training symbols 240, the device 208 may set a desired AGC level and perform channel estimation. The resulting channel estimates may permit the device 208 to demodulate beamformed data provided by the device 204. After all data 244 has been received from the device 204, an acknowledgment 248 (e.g., a legacy ACK response) may be sent from the device 208 to the device 204 at a desired TPC setting.

Figure 3:
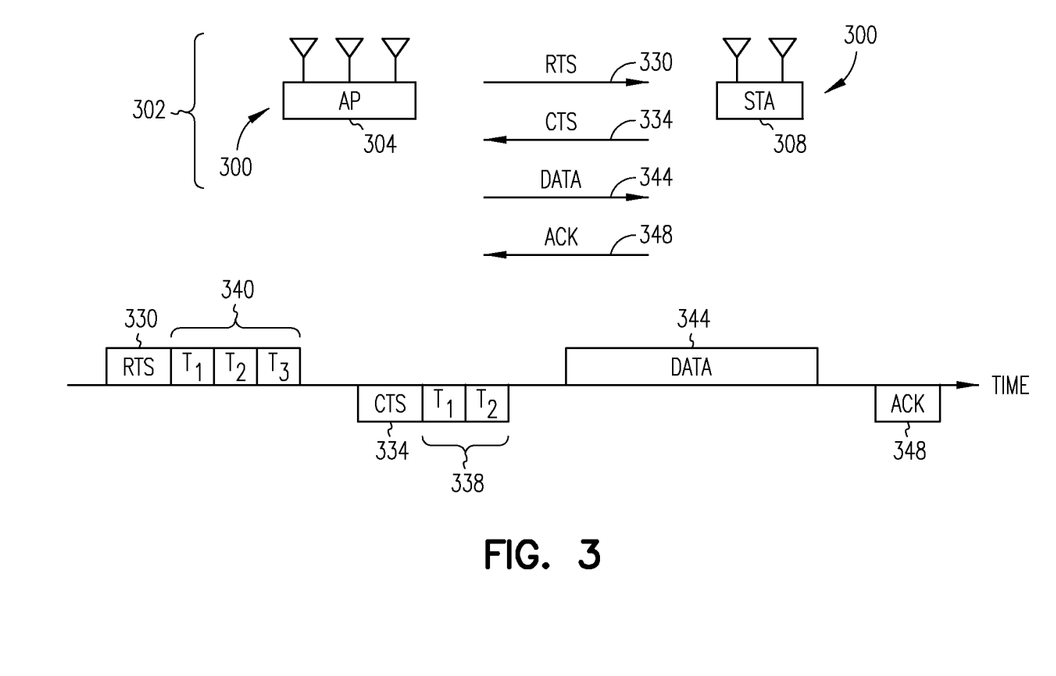
FIG. 3 is a block diagram of apparatus and a system operating according to various embodiments.
Figure 4A:
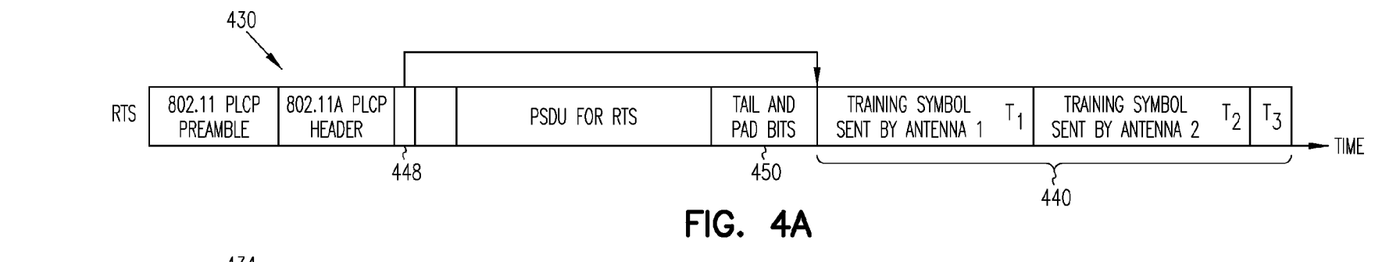
FIGS. 4A-C are block diagrams of exemplary packet formats that can be utilized by the apparatus and system of FIG. 3.
Figure 4B:
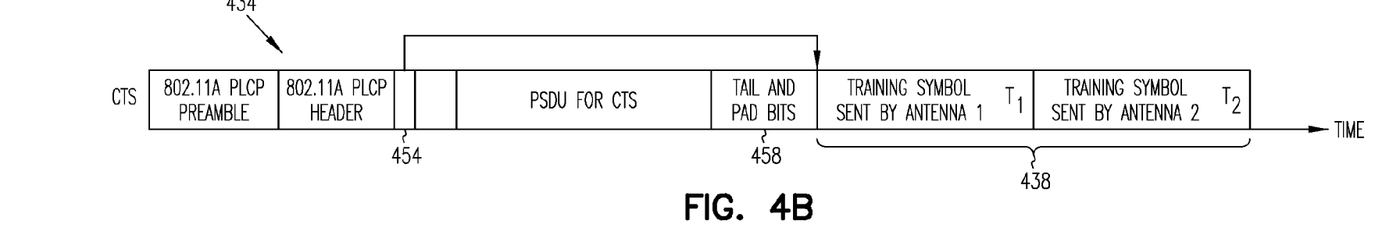
Figure 4C:
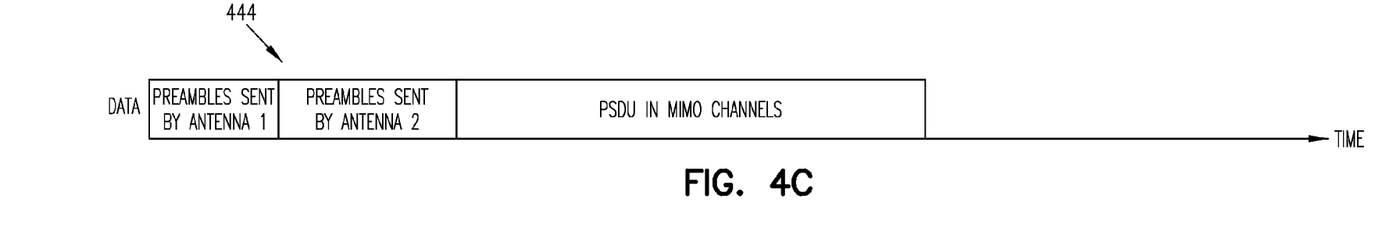

FIG. 3 is a block diagram of apparatus 300 and a system 302 operating according to various embodiments. Each device 304, 308 may be similar to or identical to devices 104, 108, respectively, shown in FIG. 1, and may include an AP and/or a STA. FIGS. 4A-C are block diagrams of exemplary formats that can be utilized by the apparatus and system of FIG. 3.

In a second scheme, advantage is taken of the fact that, according to some implementations of the IEEE 802.11 standards, RTS and CTS symbols can be transmitted in such a way as to protect long data packets from collision. Thus, the $N_t$ and $N_r$ training symbols may be attached directly to the request to transmit (e.g., legacy RTS) symbol and the clear to transmit response (e.g., legacy CTS) symbol, respectively, where $N_t$ and $N_r$ are the number of antennas at the devices (or the number of communication chains), as described previously. In each case, the training symbols may be used to both calibrate the transmitter and enable the channel estimation of the receiver in one or more of the communication chains included in the apparatus 300.

Referring now to FIGS. 3 and 4A-C, it can be seen that a device prepared to send data, for example, device 304, may transmit a symbol 330, 430 or packet, such as a legacy RTS packet, to another device, such as device 308. $N_t$ training symbols 340 may be attached to the end of the packet 330, where $N_t$ can be the number of transmit chains included in the device 304. The length field 448 in the packet 330, 430 may be set to protect up to the end of the pad bits 450, as specified in the IEEE 802.11 standard for legacy RTS packets. Thus, a legacy device may receive the RTS packet 330, 430 correctly and perform collision avoidance operations as needed.

The $N_t$ symbols 340 may be sent in turn by the $N_t$ communication chains included in the device 304. A calibration algorithm may be performed as the $N_t$ symbols 340 are sent to calibrate both the transmit and the receive chains of the device 304. The device 308 receiving the $N_t$ symbols 340, 440 and the symbol 330, 430 may estimate the associated channels and compute demultiplexing matrices to enhance data reception, as is known to those of ordinary skill in the art.

In some embodiments, calibration of M transmit/receive or communication chains at either of the devices 304, 308 may occur in such a way as to satisfy the criterion set by Equation (4). First, a training symbol $x_0$ for the n-th sub-carrier may be sent using a first transmit chain (e.g., transmit chain #1), and the output of a second receive chain (e.g., receive chain #2) may be measured. The measured output may be characterized by $t_{12} = \alpha_{A1} C_{12} \beta_{A2} x_0$, where $C_{12}$ is the response from the input of a first antenna (e.g., antenna #1 coupled to transmit chain #1) to the output of a second antenna (e.g., antenna #2 coupled to receive chain #2).

Second, a training symbol $x_0$ for the n-th sub-carrier may be sent using a second transmit chain (e.g., transmit chain #2), and the output of a first receive chain (e.g., receive chain #1) may be measured. The measured output may be characterized by $t_{21} = \alpha_{A2} C_{21} \beta_{A1} x_0$, where $C_{21}$ is the response from the input of the second antenna to the output of the first antenna.

Third, the variables $\alpha_{A1}, \alpha_{A2}, \beta_{A1}$ and $\beta_{A2}$ may be adjusted so as to render $t_{12} = t_{21}$. In some cases, this may be accomplished by changing only the variable $\beta_{A2}$. The adjustments of the chain gains can be implemented in the digital domain, if desired. After compensation is effected in this manner, the result should be:

$$\alpha_{A1} C_{12} \beta_{A2} x_0 = \alpha_{A2} C_{21} \beta_{A1} x_0 \quad (6)$$

Equation (6) may be simplified as follows, since $C_{12} = C_{21}$ due to reciprocity:

$$\frac{\alpha_{A1}}{\beta_{A1}} = \frac{\alpha_{A2}}{\beta_{A2}} \quad (7)$$

At this point, a loop may be executed with respect to the remaining communication chains, that is, for $i = 3, \ldots, M$. Each execution of the loop may involve sending a training symbol $x_0$ for the n-th sub-carrier using the first transmit chain and measuring the output of receive chain i. The measured output, characterized by $t_{1i} = \alpha_{A1} C_{1i} \beta_{Ai} x_0$, where $C_{1i}$ may be seen as the response from the input of the first antenna to the output of antenna i. Then loop execution may involve sending a training symbol $x_0$ for the n-th sub-carrier using transmit chain i, and measuring the output of the first receive chain. The measured output may be characterized as $t_{i1} = \alpha_{Ai} C_{i1} \beta_{A1} x_0$, where $C_{i1}$ can be seen as the response from the input of antenna i to the output of the first antenna.

Finally, the variables $\alpha_{Ai}$ and $\beta_{Ai}$ may be adjusted so as to render $t_{1i} = t_{i1}$. Again, in some cases, this may be accomplished by changing only the variable $\beta_{Ai}$. The adjustments of the communication chain gains may be implemented in the digital domain, if desired. After compensation is effected in this manner, the result may be:

$$\alpha_{A1} C_{1i} \beta_{Ai} x_0 = \alpha_{Ai} C_{i1} \beta_{A1} x_0 \qquad (8)$$

Since $C_{1i} = C_{i1}$ due to reciprocity, Equation (8) may be simplified as follows:

$$\frac{\alpha_{A1}}{\beta_{A1}} = \frac{\alpha_{Ai}}{\beta_{Ai}} \qquad (9)$$

The loop may be repeated for each value of i in this manner until all of the chains M have been calibrated.

The device 308 receiving the symbol 330 may respond by sending another symbol (or symbols, and/or packets, such as a legacy CTS symbol). This transmission may occur if the status of a network allocation vector (NAV) indicates the channel is idle. $N_r$ training symbols 338, 438 may be attached to the end of the symbol or packet 334, 434, where $N_r$ is the number of the receive chains included in the device 308. The $N_r$ symbols 338, 438 may be sent in turn by $N_r$ antennas coupled to the receive chains included in the device 308 to receive data packets 344, 444. As noted above, the length field 454 in the packet 334, 434 may be set to protect up to the end of the pad bits 458, as specified in the IEEE 802.11 standard for legacy CTS packets. Thus, a legacy device may receive the CTS packet 334, 434 correctly and perform collision avoidance operations as needed.

As described above, a calibration algorithm may be performed as the $N_r$ symbols 338, 438 are sent, in order to calibrate the transmit and the receive chains included in the device 308. In turn, the device 304 receiving the $N_r$ symbols 338, 438 and the response symbol 334, 434 (e.g., a legacy CTS packet) may estimate the associated channels and determine beamforming matrices for transmission of the data 344, 444.

The device 304 may then send the data 344, 444 using transmit beamforming, adaptive bit loading, and/or power allocation techniques, as is known to those of skill in the art. A symbol of acknowledgment (e.g., a legacy ACK symbol or packet) 348 may be received by the device 304 after the data 344, 444 is sent.

Upon reading this disclosure, those of skill in the art will realize that the device 308 receiving the request to send 330, 430 symbol or packet may estimate the channel matrix (e.g., for each orthogonal frequency division multiplexing (OFDM) tone) and form a corresponding demultiplexing matrix (e.g., the "U" matrix in SVD techniques) by exploiting the attached training symbols 340, 440. Since channel estimation and matrix computation are completed beforehand, the preambles at the beginning of the data packet 344, 444 may be used only for synchronization, and may not be needed for channel estimation. Thus, since the preambles of the data 344, 444 are used only for synchronization, they may be shortened. Similarly, upon reading this disclosure, those of skill in the art will realize that the device 304 receiving the clear to send response 334, 434 symbol or packet may also estimate the associated channel and compute a beamforming matrix (e.g., the "V" matrix in SVD techniques) by exploiting the attached training symbols 338, 438.

Thus, referring now to FIGS. 1, 2, and 3, it can be seen that an apparatus 100, 200, 300 may be similar to or identical to the devices 104, 108, 204, 208, and 304, 308, including devices such as an AP and/or STA. Such apparatus 100, 200, 300 may therefore include a device 104, 204, 304 having a first number of communication chains 118 to transmit to a second apparatus 100, 200, 300 or device 108, 208, 308 a first number of training symbols corresponding to the first number of communication chains 118 and to solicit a response from the second apparatus 100, 200, 300 or device 108, 208, 308 including a second number of training symbols corresponding to a number of communication chains 128 included in the second device 108, 208, 308.

The first number of communication chains 118 may correspond to a number of transmit chains 114, and the second number of communication chains 128 may correspond to a number of receive chains 126. Similarly, the first number of communication chains 118 may correspond to a number of receive chains 116, and the second number of communication chains 128 may correspond to a number of transmit chains 124. The apparatus 100, 200, 300 may include a calibration module 160 to calibrate the transmit chains 114, 124 and/or the receive chains 116, 126. The apparatus 100, 200, 300 may also include an estimation module 162 to estimate one or more channels associated with the number of receive chains 116, 126.

A system 102, 202, 302 may include a first apparatus 100, 200, 300 or device 104, 204, 304, similar to or identical to those described previously. The system 102, 202, 302 may also include a second apparatus 100, 200, 300 or device 108, 208, 308, similar to or identical to those described previously. The first apparatus 100, 200, 300 or device 104, 204, 304 may include a number of communication chains 118 to transmit a number of training symbols corresponding to the number of communication chains 118 to the second device 108, 208, 308. In turn, the second apparatus 100, 200, 300 or device 108, 208, 308 may include a number of communication chains 128 to receive the training symbols from the first device 104, 204, 304, and may respond by transmitting to the first device 104, 204, 304 a number of training symbols corresponding to the number of communication chains 128.

The system 102, 202, 302 may include a first number of antennas 112 corresponding to a first number of communication chains 118, and a second number of antennas 120 corresponding to a second number of communication chains 128. The system 102, 202, 302 may also include one or more calibration modules 160 to calibrate the communication chains 118, 128, as well as one or more estimation modules to estimate one or more channels associated with the communication chains 118, 128. In some embodiments, the communication chains 118, 128 may be capable of being coupled to a number of antennas 112, 120 to form a portion of a multiple-input, multiple-output (MIMO) system.

Figure 5A:
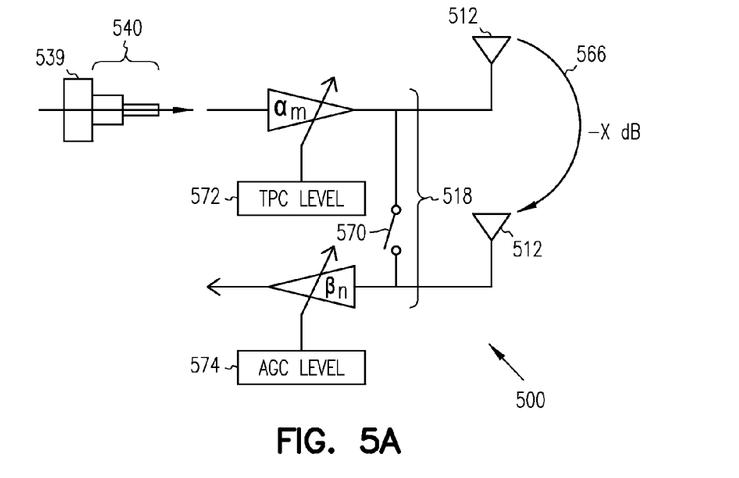
FIGS. 5A and 5B are a block diagram of an apparatus operating according to various embodiments, as well as an exemplary packet format which may be implemented thereby, respectively.
Figure 5B:
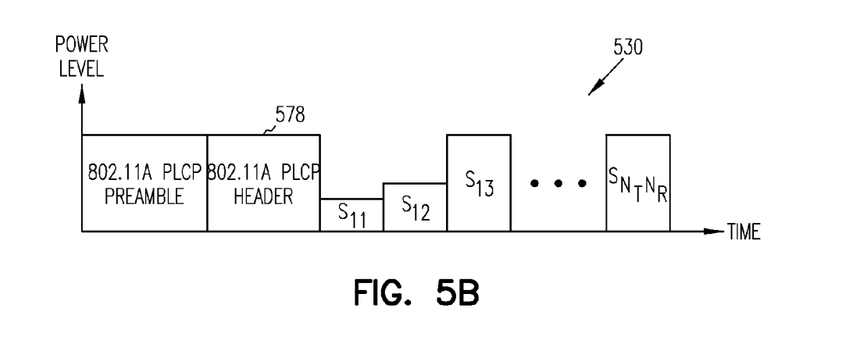

FIGS. 5A and 5B are a block diagram of an apparatus 500 operating according to various embodiments, as well as an exemplary packet format which may be implemented thereby, respectively. Calibration of the apparatus 100, 200, 300 and devices 104, 108, 204, 208, 304, 308 may be accomplished in many ways other than those described with respect to the first and second schemes explicitly described herein. For example, with respect to the second scheme outlined above, since some apparatus 500 (which may be similar to or identical to apparatus 100, 200, 300 and/or devices 104, 204, 304 and devices 108, 208, 308) periodically operate in a sleep mode, calibration may sometime be accomplished during this mode, such as after the apparatus 500 announces an upcoming sleep period. The apparatus 500 may include a communication chain 518.

In such circumstances, calibration may begin with sending a symbol or packet 530 from the apparatus 500 to the apparatus 500 itself (i.e., self-calibration). Then calibration and/or training symbols 540 can also be sent from and to itself. This type of calibration can be accomplished using antennas 512 and on-air signals 566, or via an internal switching network 570. On-air calibration may provide increased accuracy, but it may also generate interference. Use of the switching network 570 may reduce accuracy due to mismatch among switches.

Transmit gains ($\beta_{Ai}$ and $\beta_{Si}$) may vary with the TPC setting 572. Similarly, receive gains ($\alpha_{Ai}$ and $\alpha_{Si}$) may vary with the gain control setting 574, such as the AGC setting. Therefore, calibration may be used to find a set of values for one chain (typically a number of receive gain settings) for each pair of TPC and AGC settings on other chains. Assuming there are $N_T$ and $N_R$ levels for TPC and AGC respectively, then a compensation and calibration algorithm may step through all $N_T \times N_R$ settings. Gains may be selected independently of actual transmit and receive signal magnitudes.

To accomplish compensation and calibration in the sleep mode, then, an apparatus 500 may begin by announcing a coming sleep period. This announcement may be asserted by setting a value in an associated power management field of a frame. Then, for i=1, ..., $N_T$ a loop involving the following activities may be entered: set the TPC to level i for all transmit chains, then loop j times for j=1, ..., $N_R$, setting the AGC to level j for all receive chains except chain i, sending training symbols (e.g., OFDM training symbols) having a magnitude to optimize the received signal-to-noise ratio (SNR) without saturation in the receive chains while minimizing interference with other devices. These activities may be followed with calibrating as described for the second scheme above.

As shown in FIG. 5B, the training symbols 540 may be sent in a packet format to prevent nearby devices (e.g., other AP or STA devices) from interfering with calibration for the apparatus 500. For example, the packet length field in the physical layer convergence protocol (PLCP) header 578 may be used to indicate to nearby devices that calibration is in effect, and to prevent them from transmitting during that time. Training symbols 540 may be included in the data portion of the packet 530, where $S_{ij}$ is the training symbol for TPC setting i and AGC setting j. The packet 530 may be addressed to the device 500 itself.

Path loss between two calibrating antennas 512 coupled to the same apparatus 500 may be about 30-40 dB, and the path loss between two apparatus 500 or devices may be about 60-90 dB. Therefore, devices not in calibration mode should be able to operate while other devices are engaged in self-calibration. However, in some cases non-calibrating devices may interfere with self-calibrating devices, because calibration and training AGC levels may be set to normal operating levels, so that interfering signals have about the same level as training signals. Such difficulties may be resolved by sending additional calibration packets during the sleep mode, since the time spent in sleep mode by some apparatus 500 may be much longer than the time spent in active mode.

The apparatus 100, 200, 300, 500, systems 102, 202, 302, devices 104, 108, 204, 208, 304, 308, antennas 112, 120, 512, transmit chains 114, 124, receive chains 116, 126, communication chains 118, 128, 518, symbols 230, 234, 238, 240, 430, 434, 438, 440, 530, 540, data 244, 444, fields 448, 454, bits 450, 458, calibration module 160, estimation module 162, on-air signals 566, switching network 570, TPC setting 572, gain control setting 574, and PLCP header 578 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100, 200, 300, 500 and the systems 102, 202, 302, and as appropriate for particular implementations of various embodiments.

It should also be understood that the apparatus and systems of various embodiments can be used in applications other than transmitters and receivers, and other than for wireless systems, and thus, various embodiments are not to be so limited. The illustrations of apparatus 100, 200, 300, 500 and systems 102, 202, 302 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 6:
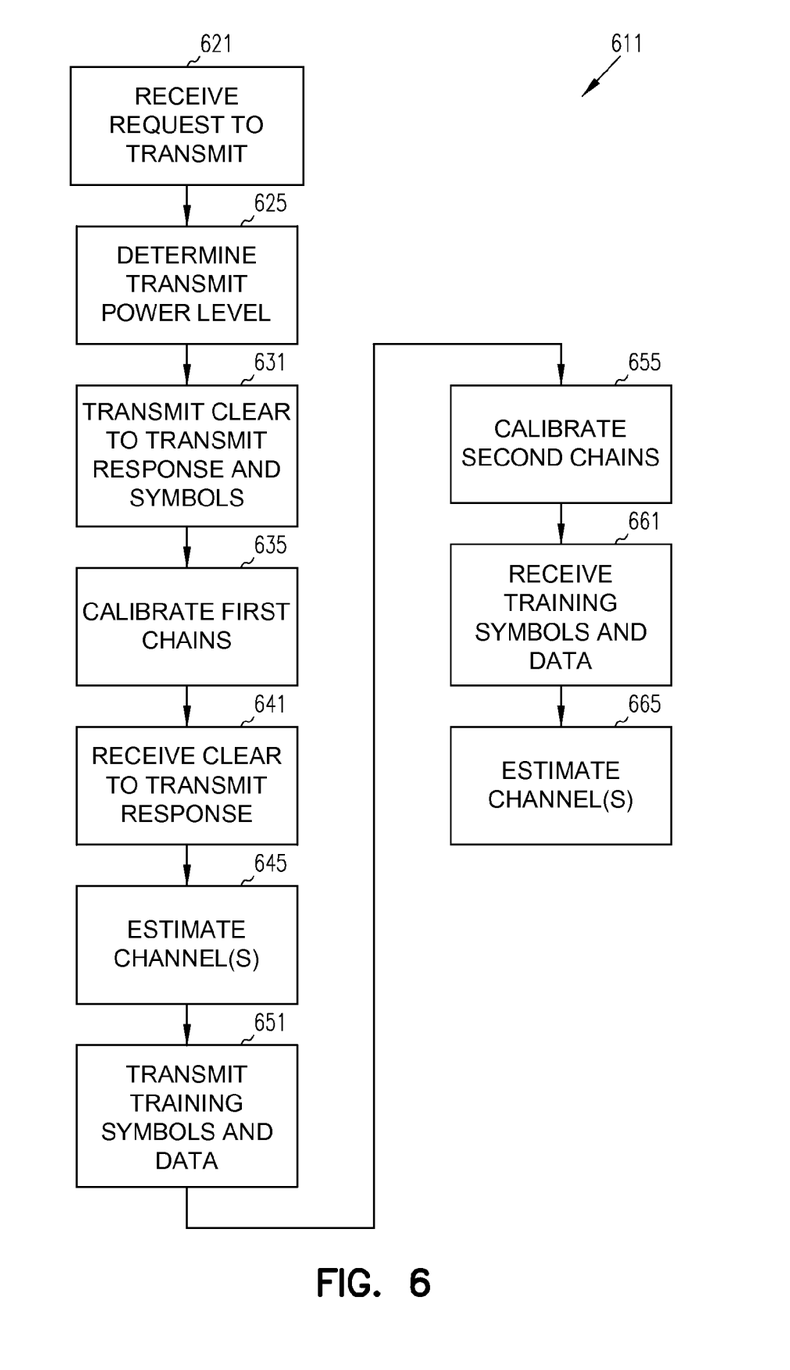
FIG. 6 is a flow chart illustrating several training and calibration methods according to various embodiments.

FIG. 6 is a flow chart illustrating several training and calibration methods according to various embodiments. With respect to this figure, it should be noted that any of the numbers of communication chains discussed may correspond to a number of receive chains, and/or to a number of transmit chains, as desired for particular implementations of the method 611. Therefore, in light of the previous discussion with respect to the first scheme, it can be seen that a method 611 directed to the operation of various embodiments of the invention disclosed may (optionally) begin with receiving a request to transmit at a first number of communication chains at block 621 and determining one or more transmit power levels and/or receive gain levels associated with the first number of communication chains at block 625. The method 611 may include transmitting a clear to transmit response and a first number of training symbols from the first number of communication chains at block 631 and calibrating some number of transmit and receive chains included in the first number of communication chains at block 635. Thus, the method 611 may include transmitting a first number of training symbols corresponding to a first number of communication chains to solicit a response including a second number of training symbols corresponding to a second number of communication chains.

The method 611 may continue with receiving a clear to transmit response and the first number of training symbols at a second number of communication chains at block 641 and estimating one or more communications channels associated with the second number of communication chains based on the first number of training symbols at block 645. The method 611 may also include transmitting the second number of training symbols and data at block 651. Thus, the method 611 may include transmitting a second number of training symbols corresponding to a second number of communication chains in response to receiving a first number of training symbols corresponding to a first number of communication chains.

The method 611 may include calibrating some number of transmit and receive chains included in the second number of communication chains based on the second number of training symbols at block 655. The method 611 may continue with receiving the second number of training symbols and data at block 661 and estimating one or more communications channels associated with the first number of communication chains based on the second number of training symbols at block 665.

Figure 7:
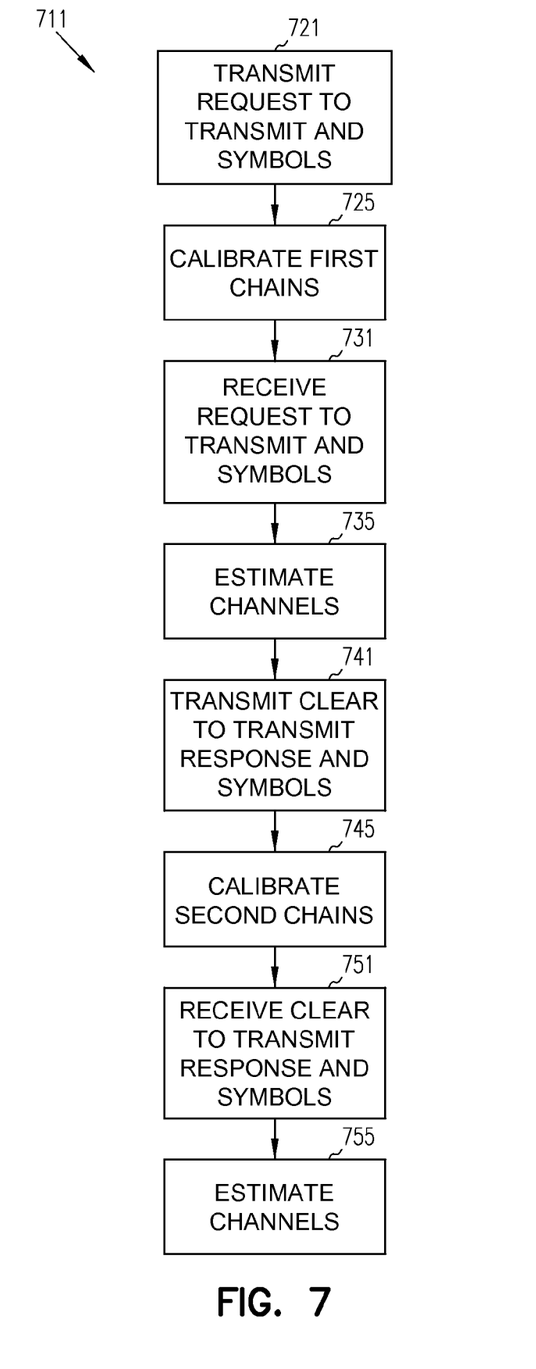
FIG. 7 is a flow chart illustrating several alternative training and calibration methods according to various embodiments.

FIG. 7 is a flow chart illustrating several alternative training and calibration methods according to various embodiments. With respect to this figure, it should be noted that any of the numbers of communication chains discussed may correspond to a number of receive chains, and/or to a number of transmit chains, as desired for particular implementations of the method 711. Therefore, in light of the previous discussion with respect to the second scheme, it can be seen that a method 711 directed to the operation of various embodiments of the invention disclosed may (optionally) begin with transmitting a request to transmit and the first number of training symbols at block 721 and calibrating one or more of the first number of communication chains at block 725. Calibrating the first number of communication chains may occur during a sleep mode. The method 711 may also include transmitting a header including a length specification corresponding to the first number of training symbols. Thus, the method 711 may include transmitting a first number of training symbols corresponding to a first number of communication chains to solicit a response including a second number of training symbols corresponding to a second number of communication chains.

The method 711 may continue with receiving a request to transmit and the first number of training symbols at block 731 and estimating one or more channels associated with the second number of communication chains at block 735. The method 711 may include transmitting a clear to transmit response and the second number of training symbols at block 741 and calibrating one or more of the second number of communication chains at block 745. Calibrating the second number of communication chains may occur during a sleep mode. Thus, the method 711 may include transmitting a second number of training symbols corresponding to a second number of communication chains in response to receiving a first number of training symbols corresponding to a first number of communication chains.

The method 711 may continue with receiving a clear to transmit response and the second number of training symbols at block 751 and estimating one or more channels associated with the first number of communication chains at block 755. The method 711 may also include transmitting a header including a length specification corresponding to the second number of training symbols.

It should be noted that the methods described herein do not have to be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized.

Figure 8:
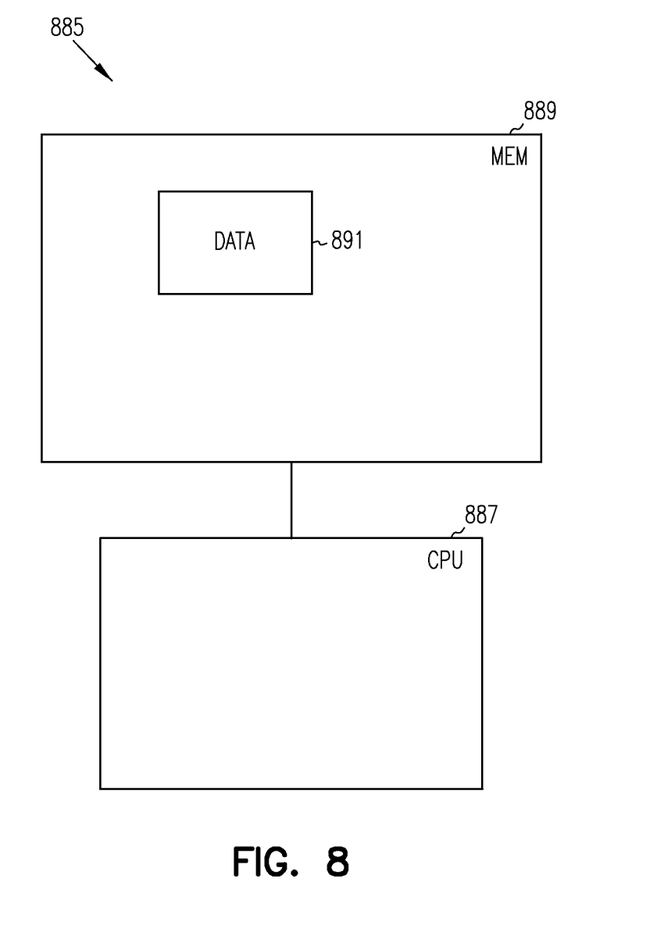
FIG. 8 is a block diagram of an article according to various embodiments.

For example, FIG. 8 is a block diagram of an article 885 according to various embodiments, such as a computer, a memory system, a magnetic or optical disk, some other storage device, and/or any type of electronic device or system. The article 885 may comprise a processor 887 coupled to a machine-accessible medium such as a memory 889 (e.g., a memory including an electrical, optical, or electromagnetic conductor) having associated information 891 (e.g., data or computer program instructions), which when accessed, results in a machine (e.g., the processor 887) performing such actions as transmitting a second number of training symbols corresponding to a second number of communication chains in response to receiving a first number of training symbols corresponding to a first number of communication chains. Other activities may include receiving a clear to transmit response and the first number of training symbols at the second number of communication chains, and estimating one or more communications channels associated with the second number of communication chains based on the first number of training symbols. Further activities may include transmitting the second number of training symbols and data, and calibrating some number of transmit and receive chains included in the second number of communication chains based on the second number of training symbols.

In some embodiments, an article including a machine-accessible medium having associated information, wherein the information, when accessed, results in a machine performing such activities as transmitting a first number of training symbols corresponding to a first number of communication chains to solicit a response including a second number of training symbols corresponding to a second number of communication chains. Additional activities may include transmitting a request to transmit and the first number of training symbols, and calibrating the first number of communication chains. Further activities may include receiving a clear to transmit response and the second number of training symbols, and estimating one or more channels associated with the first number of communication chains.

Implementing the apparatus, systems, and methods described herein may result in reducing the overhead used for calibration and training of various devices, including those forming a portion of a MIMO system. For packet sizes of approximately 500-1500 bytes, improvements in efficiency may be on the order of 30%-50%. Thus, this type of operation may in turn provide improved bandwidth utilization, and reduced communication costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term invention merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   transmitting, by a first device to a second device, a request to transmit packet having a first number of training symbols corresponding to a number of antennas used by the first device; and
   receiving, at the first device from the second device, a clear to send packet having a second number of training symbols corresponding to a number of antennas used by the second device;
   wherein the exchange of the request to send packet and the first number of training symbols corresponding to the number of antennas used by the first device and the clear to send packet and second number of training symbols corresponding to a number of antennas used by the second device is performed without channel state information (CSI) feedback between the first device and the second device.

2. The method of claim 1, wherein the first number of training symbols corresponding to the number of antennas used by the first device corresponds to a first number of communication chains of the first device and wherein the second number of training symbols corresponding to the number of antennas used by the second device corresponds to a second number of communication chains of the second device.

3. The method of claim 2 further comprising using, by the first device, the second number of training symbols from the second device to perform a calibration for estimating a communication channel associated with the first number of communication chains.

4. The method of claim 3 further comprising sending data from the first device to the second device using results from the calibration for estimating the communication channel associated with the first number of communication chains.

5. The method of claim 4 further comprising receiving an acknowledgement at the first device from the second device in response to the data being received by the second device.

6. The method of claim 1 further comprising using, by the first device, the second number of training symbols from the second device to perform a calibration of a receive chain and a transmit chain associated with each of the first number of communication chains.

7. The method of claim 1 further comprising determining a transmit power level and a receive gain level associated with a first number of communication chains corresponding to the number of antennas used by the first device.

8. The method of claim 1 further comprising transmitting a header including a length specification corresponding to the first number of training symbols.

9. A method, comprising:
   receiving, at first device from a second device, a request to transmit packet having a first number of training symbols corresponding to a number of antennas used by the second device; and
   transmitting, by the first device to the second device, a clear to send packet having a second number of training symbols corresponding to a number of antennas used by the first device;
   wherein the exchange of the request to send packet and the first number of training symbols corresponding to the number of antennas used by the second device and the clear to send packet and second number of training symbols corresponding to a number of antennas used by the first device is performed without channel state information (CSI) feedback between the first device and the second device.

10. The method of claim 9, wherein the first number of training symbols corresponding to the number of antennas used by the second device corresponds to a first number of communication chains of the second device and wherein the second number of training symbols corresponding to the number of antennas used by the first device corresponds to a second number of communication chains of the first device.

11. The method of claim 10 further comprising using, by the first device, the first number of training symbols from the second device to perform a calibration for estimating a communication channel associated with the second number of communication chains.

12. The method of claim 11 further comprising receiving data from the second device at the first device based on a calibration performed by the second device using the second number of training symbols corresponding to a number of antennas used by the first device.

13. The method of claim 12 further comprising sending an acknowledgement from the first device to the second device in response to the data being received by the first device.

14. The method of claim 9 further comprising setting an automatic gain control level and performing channel estimation for the first device to demodulate beamformed data provided by the second device.

15. The method of claim 9 further comprising receiving a header including a length specification corresponding to the first number of training symbols.

16. A wireless station (STA), comprising:
- a transmitter configured to transmit to a second wireless station, a request to transmit packet having a first number of training symbols corresponding to a number of antennas used by the STA; and
- a receiver configured to receive, from the second wireless station, a clear to send packet having a second number of training symbols corresponding to a number of antennas used by the second device;
- wherein the STA and the second wireless station exchange the request to send packet and the first number of training symbols corresponding to the number of antennas used by the first device and the clear to send packet and second number of training symbols corresponding to a number of antennas used by the second device without channel state information (CSI) feedback between the STA and the second wireless station.

17. The wireless station of claim 16, wherein the first number of training symbols corresponding to the number of antennas used by the STA corresponds to a first number of communication chains of the STA and wherein the second number of training symbols corresponding to the number of antennas used by the second wireless station corresponds to a second number of communication chains of the second wireless station.

18. The wireless station of claim 17, wherein the receiver of the STA uses the second number of training symbols from the second wireless station to perform a calibration for estimating a communication channel associated with the first number of communication chains.

19. The wireless station of claim 18, wherein the transmitter sends the data to the second wireless station using results from the calibration for estimating the communication channel associated with the first number of communication chains.

20. An article including a machine-accessible non-transitory medium having associated information, wherein the information, when accessed, results in a machine performing:
- transmitting, by a first device to a second device, a request to transmit packet having a first number of training symbols corresponding to a number of antennas used by the first device; and
- receiving, at the first device from the second device, a clear to send packet having a second number of training symbols corresponding to a number of antennas used by the second device;
- wherein the exchange of the request to send packet and the first number of training symbols corresponding to the number of antennas used by the first device and the clear to send packet and second number of training symbols corresponding to a number of antennas used by the second device is performed without channel state information (CSI) feedback between the first device and the second device.

* * * * *